(12) United States Patent
Sato et al.

(10) Patent No.: US 6,203,884 B1
(45) Date of Patent: Mar. 20, 2001

(54) MAGNETIC RECORDING MEDIUM

(75) Inventors: Satoshi Sato; Shinichi Matsumura; Yuichi Arisaka, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/211,003

(22) Filed: Dec. 15, 1998

(30) Foreign Application Priority Data

Dec. 17, 1997 (JP) ..................................................... 9-348210

(51) Int. Cl.$^7$ ..................................................... G11B 5/733
(52) U.S. Cl. ........................... 428/141; 428/323; 428/336; 428/474.4; 428/694 ST; 428/694 SL; 428/900
(58) Field of Search ..................................... 428/141, 323, 428/336, 474.4, 694 ST, 694 SL, 900

(56) References Cited

U.S. PATENT DOCUMENTS 5,853,907 * 12/1998 Yamada et al. ................. 428/694 SG
5,972,474 * 10/1999 Tsuzuki et al. ....................... 428/141
5,993,938 * 11/1999 Tsukuda et al. ....................... 428/141

* cited by examiner

Primary Examiner—Stevan A. Resan
(74) Attorney, Agent, or Firm—Sonnenschein, Nath & Rosenthal

(57) ABSTRACT

The present invention provides a metal thin film type magnetic recording medium including a non-magnetic substrate made from a polyamide film whose surface configuration is controlled so as to obtain an optimal fine configuration of a magnetic layer surface, enabling to simultaneously obtain a preferable electro-magnetic conversion characteristic and preferable running characteristic.

The non-magnetic substrate is made from an aromatic polyamide film formed in such a manner that fine protrusions having an average height of 5 to 50 nm are formed in a range of $10^3$ to $10^5$ thousand pieces/mm$^2$ on a surface where a ferromagnetic metal thin film is to be formed.

5 Claims, 4 Drawing Sheets

MAGNETIC RECORDING MEDIUM

BACKGROUND OF THE INVENTION

1. Field of the Invention

The present invention relates to a magnetic recording medium using a ferromagnetic metal thin film and in particular, to a magnetic recording medium which can preferably be used as a video tape for a long-time recording or a tape streamer of a large capacity.

2. Description of the Prior Art

Conventionally, polyethylene terephthalate has been widely used as a substrate forametal thin film type magnetic recording medium. Home video cassette tapes such as an 8 mm tape use a polyethylene terephthalate film having a thickness of 7 to 10 micrometers. Tape streamers for computer data backup use a polyethylene terephthalate film having a thickness of 5 to 7 micrometers.

Recently, with reduction in the video cassette size, there is a need for a video cassette magnetic recording medium reduced in size and capable of recording for a long time. Moreover, with increased of the information amount, tape streamers are also required to have a larger capacity. In order to satisfy these requirements, there has been examined to reduce the thickness of the magnetic recording medium.

To reduce a thickness of a magnetic recording medium, one approach is to reduce the thickness of the substrate. However, reduction of the substrate thickness brings about lowering of stiffness of the magnetic recording medium and deterioration of the skew characteristic.

To reduce the substrate thickness while satisfying the stiffness and the skew characteristic of the magnetic recording medium, it is necessary to obtain a substrate which simultaneously has a high strength and a low heat absorption which oppose to each other.

When using a polyethylene terephthalate film as a substrate, a technique such as a repeated expansion has been used to satisfy the aforementioned requirement, or ageing has been applied to reduce heat absorption.

However, the thickness of substrate is still being reduced. There is already a limit in the strength characteristic when using the polyethylene terephthalate.

To cope with this, a polyamide film has been examined and began to be used in practice as a substrate of the metal thin film type magnetic recording medium.

A polyamide film has a higher strength than the polyethylene terephthalate film Accordingly, a magnetic recording medium using this polyamide film as the substrate can be reduced in thickness. A great expectation is posed on this polyamide film for a magnetic recording medium to answer to the increased recording time of the video cassette and the larger capacity of the tape streamer.

In general, to increase the recording density of a magnetic recording medium, it is necessary to obtain a flat and smooth surface and to reduce a spacing loss as much as possible. However, if a magnetic recording medium has a surface too flat and smooth causes a problem in the head touch and running characteristics. Accordingly, it is necessary to control the fine surface configuration to assure an appropriate surface characteristic.

Furthermore, the relative speed between a magnetic head and a magnetic recording medium has been increased. There is a need to obtain a magnetic recording medium having a high durability with little wearing in the magnetic layer. From this viewpoint also, it is indispensable to control the fine surface configuration of the magnetic recording medium.

On the other hand, a metal thin film type magnetic recording medium has a magnetic layer made from a ferromagnetic metal thin film which is very thin. Accordingly, the magnetic layer is easily affected by the surface of the substrate. That is, the surface state of the non-magnetic substrate, i.e., surface roughness directly appears as the roughness of the magnetic layer surface.

Consequently, in the metal thin film type magnetic recording medium it is necessary to control the surface configuration of the non-magnetic substrate so as to obtain an appropriate state of the fine configuration of the magnetic layer surface.

SUMMARY OF THE INVENTION

It is therefore an object of the present invention to provide a metal thin film type magnetic recording medium including a non-magnetic substrate made from a polyamide film and having a surface configuration controlled to make a magnetic layer surface have an appropriate fine configuration so as to have a preferable electro-magnetic conversion characteristic as well as a preferable running characteristic.

The magnetic recording medium according to the present invention includes a ferromagnetic metal thin film formed on a non-magnetic substrate made from an aromatic polyamide film so as to have $10^3$ to $10^5$ thousand fine protrusions per $mm^2$ having an average height of 5 to 50 nm formed on its surface where the ferromagnetic metal thin film is to be formed.

By controlling the surface configuration of the non-magnetic body made from an aromatic polyamide film in this way, it is possible to obtain an optimal surface fine configuration of the ferromagnetic metal film, which in turn enables to simultaneously obtain a preferable electro-magnetic conversion characteristic and a preferable running characteristic.

DETAILED DESCRIPTION OF PREFERRED EMBODIMENTS

Figure 1:
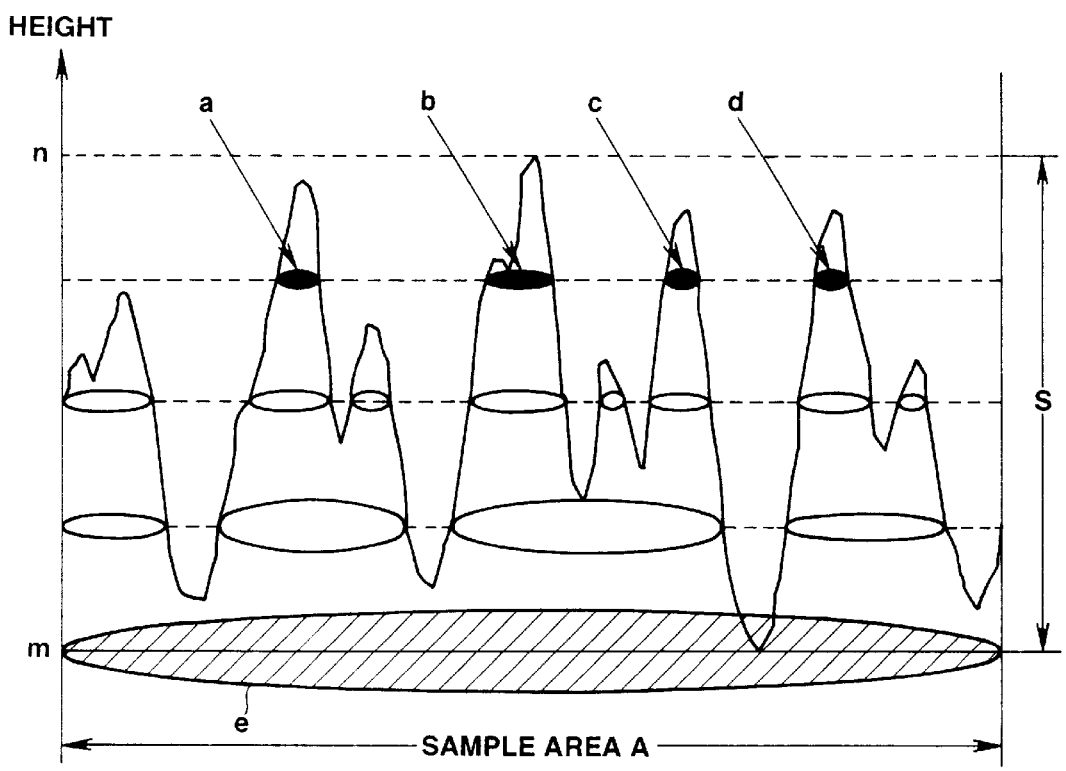
FIG. 1 shows fine protrusions formed on a surface of a non-magnetic substrate.

Description will now be directed to embodiments of the preset invention with reference to the attached drawings.

The magnetic recording medium according to the present invention includes a ferromagnetic metal thin film formed on a non-magnetic substrate made from an aromatic polyamide film.

As for the aromatic polyamide film used for the non-magnetic substrate of this magnetic recording medium, it especially preferable to use a polyamide resin expressed by Chemical Formula (I) or (II) shown below or a copolymer of these resins.

[Chemical Formula 1]

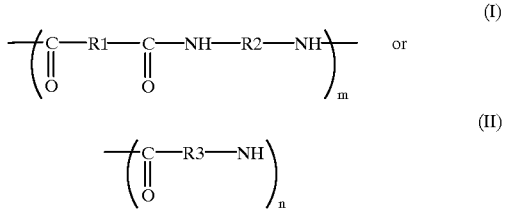

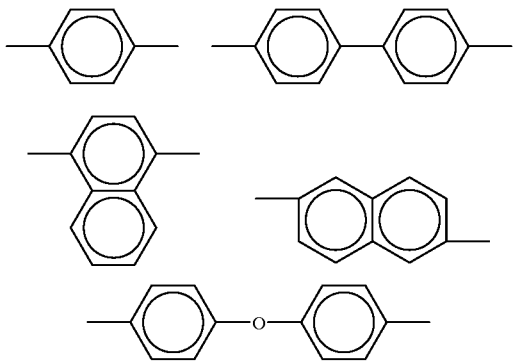

(wherein R1, R2, and R3 selected from a group consisting of the followings:

These hydrogen atoms may be replaced by functional groups such as halogen. methyl, ethyl, metoxy, nitro, sulfone, or the like. The m and n represent average polymerization degrees of about 50 to 100.)

It should be noted that this aromatic polyamide may contain or blended with a polymer or copolymer other than those given if the content does not exceed about 20%.

When producing a film from these polymers, these polymers are dissolved in a solvent such as dimethyl acetoamide, dimethyl formamide, n-methyl pyrolidon, hexamethyl phosphor amide, γ-butyrolactone, tetramethyl urea, dioxane, and the like, or mixture of these, with or without addition of an inorganic salt such as lithium chloride, calcium chloride, lithium carbonate, lithium nitride as neutralized products of the raw polymer liquid.

These film forming solvents are used together with an aromatic polyamide resin obtained by polymerization or binding of p-phenylene diamine, m-phenylene diamine, o-phenylene diamine, 2-nitro-p-phenylene diamine, 2-chlor-p-phenylene diamine, 4,4'-diaminobiphenyl, 3,3'-chlorbenzine, or other aromatic diamines and terephthalic acid chloride, 2-chlorterephthalic acid chloride, terephthalic acid hydrazide, p-amino benzoic acid chloride, or other aromatic dicarbonic acids, so as to form the aromatic polyamide film way of technique such as solution molding.

The aromatic polyamide film thus obtained was expanded in the length direction and the width direction to make a non-magnetic substrate having a thickness of 2.0 to 6.0 micrometers. The non-magnetic substrate having the thickness in this order has a sufficient strength, enabling to make thin the magnetic recording medium that can endure for a long recording time.

Moreover, this non-magnetic substrate is prepared so as to have fine protrusions having a height of 5 to 50 nm in the number of $10^3$ to $10^5$ thousand/mm$^2$, and more preferably $5 \times 10^3$ to $5 \times 10^4$ thousand/mm$^2$, and still further preferably $8 \times 10^3$ to $2 \times 10^4$ thousand/mm$^2$ formed on the main surface of this non-magnetic substrate where a ferromagnetic metal thin film is to be formed.

If the number of the fine protrusions having the height of 5 to 50 nm is less than $10^3$ thousand/mm$^2$, the magnetic recording medium has a too much flat and smooth surface and brings about a problem in the head touch and the running characteristic. Moreover, if the number of the fine protrusions having the height of 5 to 50 nm is more than $10^5$ thousand/mm$^2$, the spacing loss is increased, lowering the electro-magnetic conversion characteristic.

The magnetic recording medium according to the present invention has $10^3$ to $10^5$ thousand/mm$^2$ fines protrusions having a height of 5 to 50 nm formed on the mains surface of the non magnetic substrate where a ferronmagnetic metal thin film is to be formed and accordingly, can exhibit both of a preferable electro-maunetic conversion characteristic and a preferable running characteristic.

Moreover, in this magnetic recording medium, it is preferable that the main surface of the non-magnetic substrate where a ferromagnetic metal thin film is to be formed has fine protrusions having a height of 5 to 50 nm in the number of $1 \times 10^3$ to $1 \times 10^5$ thousand/mm$^2$, and $10^3$ to $5 \times 10^3$ thousand/mm$^2$ in the upper 25% of a load curve obtained from the side of the fine protrusions, with a total of cross sectional areas of the fine protrusions in a range from 0.1 to 0.5%.

Here, the load curve is determined as follows. First, among indentations formed between the fine protrusions, a deepest indentation is selected so that its bottom determines a position of a horizontal plane as a reference plane of a sample area. The fine protrusions are cut horizontally at a predetermined height from this reference plane, and a total of cross sectional areas of the cut fine protrusions is compared to the area of the reference plane. The ratio of the total cross sectional area with respect to the reference area is obtained at several heights. The ratios thus obtained make the load curve.

Figure 2:
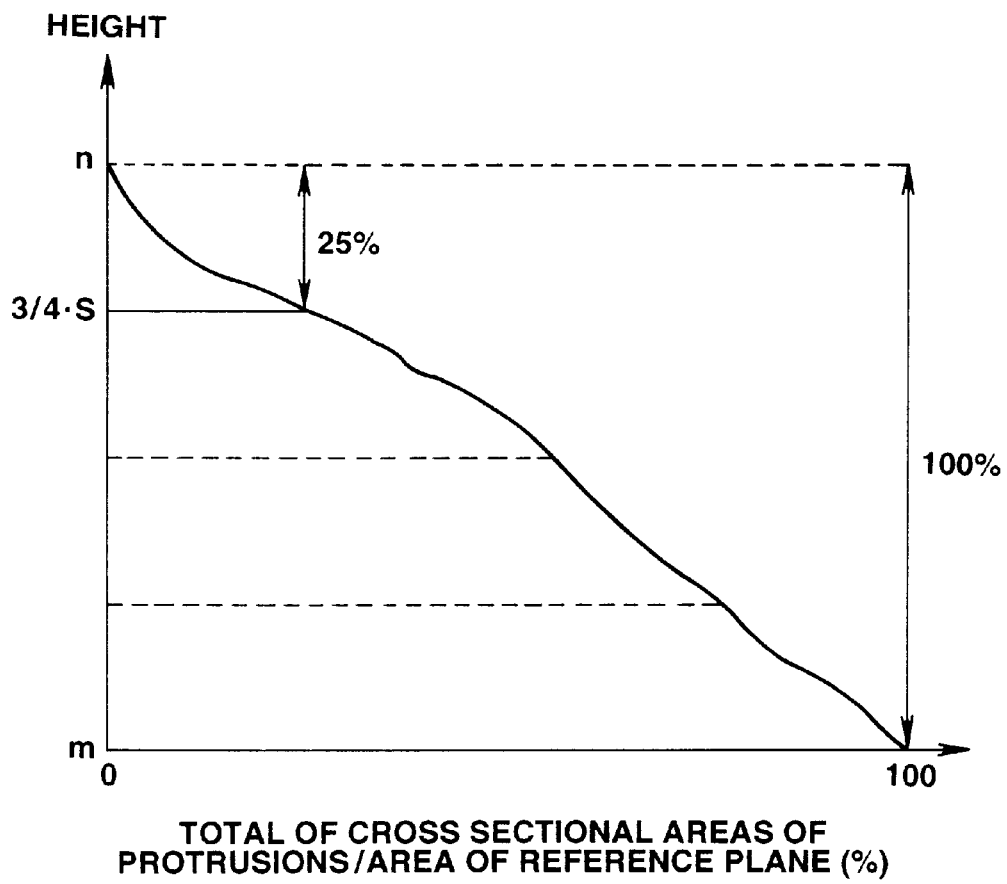
FIG. 2 shows a load curve obtained from the fine protrusion side.

That is, as shown in FIG. 1 and FIG. 2, the deepest indentation formed by the fine protrusions is assumed to have a height "m", and the highest protrusion is assumed to have a height "n". If the distance m–n is assumed to be "s", it is preferable that the number of the fine protrusions having a height exceeding ¾×s+m be in a range from $10^3$ to $5 \times 10^3$ thousand/mm$^2$, and the total of the cross sectional areas a, b, c, and d at of the fine protrusions having a height exceeding ¾×s+m be 0.1 to 0.5% of the reference area e. It should be noted that FIG. 1 shows fine protrusions in a sampling area A of the non-magnetic substrate, and FIG. 2 shows the load curve in this area A.

Thus, when non-magnetic substrate is controlled to have fine protrusions having a height of 5 to 50 nm in a range of $1 \times 10^3$ to $1 \times 10^5$ thousand/mm$^2$ in number, and in the range of $10^3$ to $5 \times 10^3$ thousand/mm$^2$ in the upper 25% of the load curve, the magnetic recording medium can exhibit a further preferable electro-magnetic conversion characteristic and running characteristics.

Moreover, when the non-magnetic substrate is controlled so that the ratio of the cross sectional areas of the fine protrusions is in a range from 0.1 to 0.5% in the upper 25% of the of the load curve obtained from the side of the fine protrusions, the magnetic recording medium can exhibit a preferable friction characteristic during recording/reproduction.

It should be noted that it is preferable that in the upper 25% of the load curve obtained from the side of the fine protrusions, a cross sectional area per protrusion be $1.5 \times 10^3$ nm$^2$ or below. This further improves the friction characteristic of the magnetic recording medium during recording and reproduction.

The fine protrusions may be formed, for example, by adding inactive fine particles into the aromatic polyamide film, or by providing a polymer film containing fine particles, or by using these methods in combination.

As for the inactive particles serving as kernels of the fine protrusions, there can be exemplified silica, calcium carbonate, titanium dioxide, alumina, kaolin, talc, graphite, feldspar, molybdenum dioxide, carbon black, barium nitrate, and other inorganic particles; and polystyrene, polymethylmethacrylate, methyl methacrylate copolymer, methyl methacrylate copolymer bridged, polytetrafluoroethylene, polyvinylidene fluoride, polyacrylonitrile, benzoguanamine resin, other organic fine particles. It is preferable to use colloidal silica, bridged polymer particles enabling to obtain true-spherical particles.

When adding these inactive fine particles into the aforementioned aromatic polyamide film, the inactive fine particles are added to a solvent prior to polymerization, or may be dispersed in a solvent used for polymerization, or may be added during a polymer solution preparation step.

It should be noted that the fine protrusions may be formed by other method than the addition of fine particles if the non-magnetic substrate and the high molecular film can have a surface configuration similar to the surface obtained by addition of fine particles.

Furthermore, as for particles to be added to the non-magnetic substrate, it is possible to use the same type of organic material as the aromatic polyamide resin which is used as the raw material of the non-magnetic substrate and not dissolved is the solvent during the aforementioned solution preparation.

The organic particles added to the aromatic polyamide resin, i.e., the raw material of the non-magnetic substrate are not dissolved when heated to a high temperature of 300° C. or above and remain as protrusions. By adjusting the amount of the organic substance added, it is necessary to obtain the protrusion density of $10^3$ to $10^5$ thousand/mm$^2$.

Moreover, when these inactive particles are contained in a high molecular film to form protrusions, for example, a water-soluble high molecular substance containing the inactive fine particles is applied to the main surface of the aforementioned aromatic polyamide film where a ferromagnetic metal magnetic film is to be formed. Thus, fine protrusions are formed on the main surface of the non-magnetic substrate where the ferromagnetic metal magnetic film is to be formed.

Here, the water-soluble high molecular substance may be polyvinyl alcohol, tragacanth gum, casein, gelatin, methyl cellulose, hydroxyethyl cellulose, carboxymethyl cellulose, polyester, and the like.

Moreover, it is preferable to add inactive particles having an average particle diameter of 0.03 to 0.15 micrometers to the non-magnetic substrate so that the protrusions are formed with density of $10^3$ to $10^5$ pieces/mm$^2$ on the surface of the non-magnetic substrate where a ferromagnetic metal thin film is to be formed.

Moreover, in order to obtain a preferable handling characteristic of the non-magnetic substrate, for example, it is preferable to form a tow-layered or three-layered aromatic polyamide film having a surface where non ferromagnetic metal thin film is to be formed, with a surface roughness Ra in a range from 0.005 to 0.025 micrometers, and more preferably, in a range from 0.010 to 0.020 micrometers.

Adjustment of the surface roughness of the surface of the non-magnetic substrate where no ferromagnetic metal thin film is to be formed is carried out by adjusting the particle size and amount of addition of the inactive particles added into the film.

Figure 3:
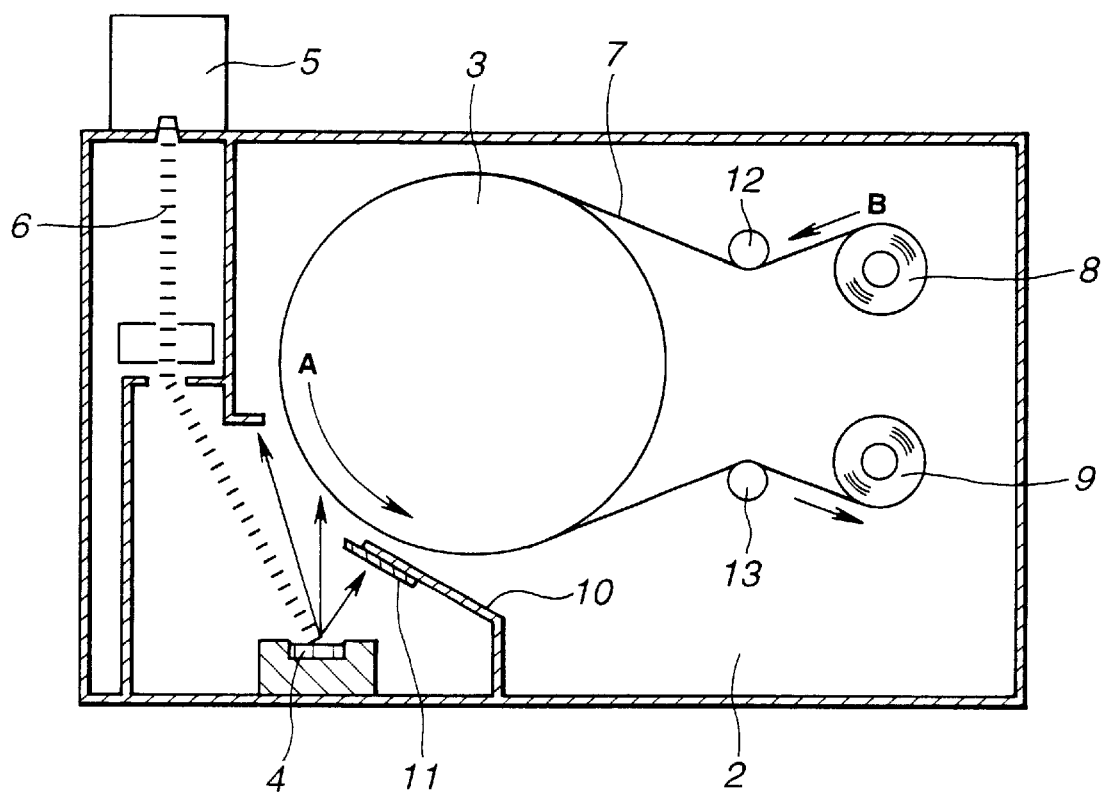
FIG. 3 shows a configuration of a vacuum deposition apparatus for forming a ferromagnetic metal thin film.

On the main surface of the non-magnetic substrate thus prepared, a ferromagnetic metal thin film is formed using a continuous-roll type vacuum deposition apparatus as shown in FIG. 3.

This vacuum deposition apparatus 1 is constituted for a so-called oblique deposition and includes a vacuum chamber 2 having a vacuum state in the order of about $10^{-3}$ Pa. In this chamber a cooling can 3 and a deposition source 4 for a ferromagnetic metal thin film are provided. The cooling can 3 is cooled down to −20° C. for example and is rotated counterclockwise (in the direction of arrow A) in the figure. The deposition source 4 is arranged so as to oppose to this cooting can 3.

The deposition source 4 is a ferromagnetic metal material containing Co or the like as a main content contained in a crucible or other contained. An electron beam generator 5 accelerates and radiates an electron beam 6 to heat to evaporate the ferromagnetic metal material, so as to be deposited on a non-magnetic substrate 7 supplied from a supply roll 8 rotating counterclockwise in the figure so as to travel along the circumferential surface of the cooling can 3. The non-magnetic substrate 7 having a ferromagnetic metal thin film formed is rolled up by a take-up roll 9.

Here, a protection plate 10 is provided between the deposition source 4 and the cooling can 3. On the protection plate 10, a shutter 11 is attached in such a manner that the shutter 11 can be moved to change its position so as to allow to pass only the deposition particles coming at a predetermined angle against the non-magnetic substrate 7. Thus, the metal magnetic film is formed by way of the oblique deposition method.

It should be noted that a guide roller 12 is arranged between the supply roll 8 and the cooling can 3, and another guide roller 13 is arranged between the cooling can 3 and the take-up roll 9, so as to apply a predetermined tension to the non-magnetic substrate 7 supplied from the supply roll 8 to travel along the cooling can 3 toward the take-up roll 9. Thus, the non-magnetic substrate can travel smoothly.

Furthermore, during the deposition of such the metal magnetic thin film, an oxygen gas is supplied onto the surface of the non-magnetic substrate 7 at a flow rate of 2 L/minute via an oxygen gas inlet (not depicted), so as to improve the magnetic characteristic, durability, and weather resistance of the metal magnetic thin film. Moreover, for heating the deposition source, instead of the aforementioned electron beam heating means, it is possible to use, for example, resistor heating means, high frequency wave heating means, laser heating means, and other known means.

The above explanation has been given on a case when forming a ferromagnetic metal thin film containing Co as a main content by way of the oblique deposition method. However, it is also possible to use a method for forming a ferromagnetic metal thin film other the aforementioned such as the vertical deposition method, ion plating method, sputtering method, and other know thin film formation methods. Moreover, as for the material of the ferromagnetic metal thin film, it is also possible to use a ferromagnetic metal material containing Ni or Fe as the main content or a ferromagnetic metal material using an alloy of these materials. Note that it is preferable to a ferromagnetic metal thin film containing oxygen obtained in an atmosphere containing a oxygen gas as a main content during a deposition, taking consideration on improvements of the adhesion strength to the non-magnetic substrate or corrosion resistance or the wearing resistance of the ferromagnetic metal thin film itself. Moreover, the ferromagnetic metal thin film preferably has a thickness in the order of 0.01 to 0.2 micrometers, or more preferably in a range from 0.1 to 0.2 micrometers.

Moreover, in this magnetic recording medium, in order to prevent wearing of the ferromagnetic metal thin film, it is preferable to form a carbon protection film on the ferromagnetic metal thin film using a magnetron sputter apparatus 20 as shown in FIG. 20.

This magnetron sputter apparatus 20 is covered externally by a chamber 21. The chamber 21 has a pressure reduced to about $10^{-4}$ Pa by a vacuum pump 22. After this, a valve 23 is closed from an full open state to a 10-degree state to decrease the air exhaust rate, so that an Ar gas is introduced from a gas introduction pipe 24 to adjust the vacuum state to about 0.8 Pa.

The magnetron sputter apparatus 20 includes in the chamber, a cooling can 25 and a target arranged to oppose to this cooling can 25. The cooling can 25 is cooled down to about −40° C. and rotated counterclockwise (in the direction of arrow A) in the figure.

The target 26 serves as a material for the carbon protection film and is supported by a backing plate 27 constituting a cathode. A magnet 28 to form a magnetic field is provided on a back side of the backing plate 27.

When forming a carbon protection film using this magnetron sputter apparatus 20, Ar gas is introduced from the gas introduction pipe 24 and a voltage of 3000 V is applied between the cooling can 25 as an anode and the backing plate 27 as a cathode, so as to maintain a current of 1.4 A flowing.

With the voltage, the Ar gas is plasmatized to attack the target 26 with ions, so that atoms are struck out from the target 26. Here, the magnet 28 provided on the back side of the backing plate 27 forms a magnetic field in the vicinity of the target 26. Accordingly, the ions are concentrated to the vicinity of the target 26.

The atoms struck out from the target 26 adhere to the ferromagnetic metal thin film formed on the non-magnetic substrate 30 supplied from the supply roll 20 rotating counterclockwise in the figure, so as to travel along the circumferential surface of the cooling can 25. Thus, a carbon protection film is formed on the non-magnetic substrate 30, which is rolled up by the roll-up roll 31.

This carbon protection film preferably has a thickness in the order of 3 to 15 nm, and more preferably in a range from 5 to 10 nm, so as to reduce the spacing loss and obtain a wear-preventing effect of the ferromagnetic metal thin film.

The explanation has bee given on formation of the carbon protection film by way of the magnetron sputter. However, the carbon protection film may also be formed by way of the ion beam sputter method, the ion beam plating method, the chemical vapor deposition (CVD) method, and other known thin film formation method.

Moreover, it is preferable to provide a lubricant on the surface of the carbon protection film. This cam further improve the running characteristic obtained by the fine protrusions.

Moreover, this magnetic recording medium may contain an anti-corrosive agent, charge-preventing agent, mildew-preventing agent, and other various additives on its surface or back surface or in the vicinity of the surfaces, or in the vacant spaces in the carbon protection film or the ferromagnetic metal thin film, or on the boundary between the carbon protection film and the ferromagnetic metal thin film, on the boundary between the ferromagnetic metal thin film and the non-magnetic substrate, or within the non-magnetic substrate. These agents may be contained using known means.

Moreover, in the magnetic recording medium, it is preferable to form a backcoat layer on the back surface so as to assure a preferable running characteristic. This backcoat layer may be formed, as is known, using carbon, calcium carbonate, and other non-magnetic pigments dispersed in a binder such as polyurethane, vinyl chloride-vinyl acetate copolymer, and the like.

EXAMPLES

Hereinafter, description will be directed to specific examples of the present invention.

Firstly, magnetic recording media (Examples 1 to 14 and Comparative Examples 1 to 7) were actually prepared and they were evaluated in the tape characteristic, contact characteristic, and preservation characteristic determined as follows.

<Young's Modulus>

The Young's modulus was determined under conditions of 25° C. and 55% RH using a tension test apparatus of Tensiron type.

<Surface Protrusion Height>

Using an inter-atom force microscope (AFM) Nano Scope II (trade name) produced by Digital Instruments, the ferromagnetic metal thin film of the non-magnetic substrate was observed under the conditions of scan size 5 micrometers×5 micrometers, the sampling number of 400 points, and the scan rate of 4.34 Hz. Heights of ten protrusions were measured and their average was obtained as the surface protrusion height.

<Number of Surface Protrusions>

The number of fine protrusions was measured by using a scan electron microscope (SEM). The SEM actually used was an Ultra-resolution Cold FE-SEM (trade name) produced by Nippon Electron Co., Ltd. with an acceleration voltage of 20 kV and magnification of 30,000 or above. The count obtained was converted into a count per 1 $mm^2$.

As for the number of protrusions formed by adding inactive particles in the polyamide resin, like the fine protrusions having a height of 5 to 50 nm, the number was counted using a scan electron microscope (SEM) with magnification set to 5000 or above. The count obtained was converted into a count per 1 $mm^2$.

<Tape Characteristics>

The magnetic medium as a tape was evaluated by using the AIT drive SDX-S300C. (trade name) produced by Sony Co., Ltd with some revision. The recording was carried out at a relative speed of 10.04 m/second and with the shortest recording wavelength of 0.35 micrometers.

For the running durability, the magnetic recording medium was made to run 170 m by 10 paths, so as to determine a block error rate after one-path running, a block error rate after 100-path running, and a tape scream in the rotary head cylinder block after the 100-path running.

<Contact With a Head>

An output signal (contact waveform) during a tape reproduction was observed for one track to determine the maximum value and the minimum value (in %) of the output signal.

<Preservation Characteristics>

The magnetic recording medium was made to record 170 m at a normal temperature (25° C.) and normal humidity and then preserved for 3 days under the condition of 45° C. and 80% RH. After this, reproduction was performed from the magnetic recording medium to determine increase in the error rate.

Example 1

Dehydrated n-methylpyiolidon was mixed with 0.9 moll ratio of 2-chlor-p-phenylenediamine and 0.1 moll ratio of 4,4'-diamino diphenyl sulfone to be dissolved and cooled, to which 0.7 moll ratio of terephthalic acid chloride was added and mixed for about 2 hours. After this, sufficiently refined calcium hydrate was added to the aforementioned mixture and mixed to obtain an aromatic polyamide solution.

This aromatic polyamide solution was uniformly applied on a metal drum having a polished surface at 30° C. and dried for about 10 minutes in an atmosphere of 120° C. to form an aromatic polyamide film. This film was peeled off fro the metal drum in impregnated in water of 30° C. continuously for about 30 minutes while the film was expanded in the length direction by 1.1. Furthermore, the film was introduced into a tenter and expanded in the length direction by 1.3 at 320° C., so as to obtain a non-magnetic substrate having a thickness of about 4 micrometers.

An aqueous paint containing $SiO_2$ particles having a particle diameter of about 15 nm was applied to a surface of the non-magnetic substrate and dried to form a polymer film.

Next, a continuous roll-up type deposition apparatus as shown in FIG. 3 was set to a vacuum in the order of about $10^{-3}$ Pa by removing the air, and the non-magnetic substrate having the polymer film was set in this deposition apparatus. The continuous vacuum oblique deposition method was used to form a ferromagnetic metal thin film containing Co as a main content on the surface of this non-magnetic substrate under existence of a very small amount of oxygen. The deposition incident angle was set so that the non-magnetic substrate had a normal direction at 90 to 45 degrees. The electron beam was adjusted so as to obtain the ferromagnetic metal thin film having a thickness of about 0.18 micrometers with the running speed of the non-magnetic substrate at 50 m/minute.

Figure 4:
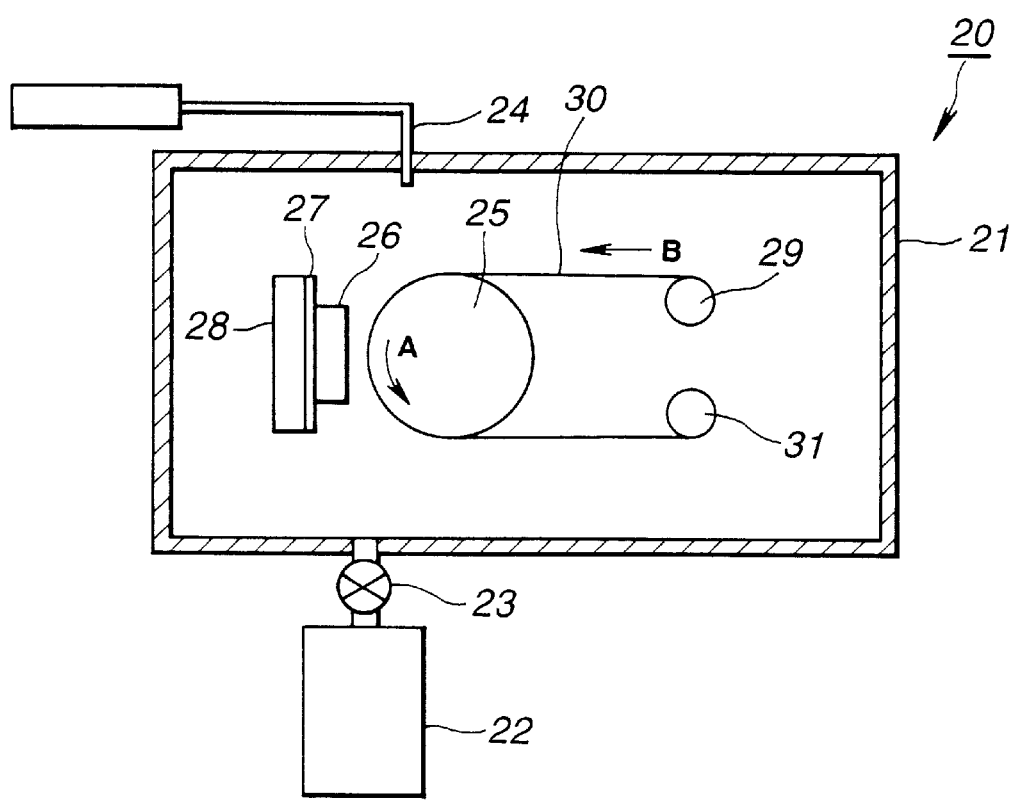
FIG. 4 shows a configuration of a magnetron sputter apparatus for forming a carbon protection film.

Next, the magnetron sputtering apparatus as shown in FIG. 4 was set to an internal pressure in the order of $10^{-4}$ Pa, and Ar gas was introduced up to an internal pressure of about 0.8 Pa. In this magnetron sputtering apparatus, the non-magnetic substrate having the ferromagnetic metal thin film was set so as to travel along the cooling can cooled down to −40° C. at the speed of 5 m/minute, so that a carbon protection film having a thickness of about 5 nm was formed on the ferromagnetic metal thin film.

Next, the opposite surface of the non-magnetic substrate not having the ferromagnetic metal thin film was covered by a backcoat layer of carbon black as a main content with a vinyl chloride binder with a thickness of about 0.5 micrometers. The tape material thus obtained into an 8-mm thickness of magnetic recording medium, which was set on a cassette body.

Table 1 shows properties of this magnetic recording medium and Table 2 shows characteristics of the magnetic recording medium.

TABLE 1

| | Protrusions generated by additive particles | | After hardening agent added | | Substrate Young's modulus ($kg/mm^2$) | |
|---|---|---|---|---|---|---|
| | Particle size ($\mu$m) | Number of protrusion (Pieces/$mm^2$) | Surface protrusion height (nm) | Number of protrusion (thousand/$mm^2$) | Length direction | width direction |
| Example 1 | None | | 20 | $1 \times 10^4$ | 1000 | 1300 |
| Example 2 | None | | 10 | $1 \times 10^5$ | 1000 | 1300 |
| Example 3 | None | | 30 | $1 \times 10^4$ | 1000 | 1300 |
| Example 4 | None | | 40 | $5 \times 10^3$ | 1000 | 1300 |
| Example 5 | None | | 25 | $1 \times 10^3$ | 1000 | 1300 |
| Example 6 | 0.06 | $1 \times 10^4$ | 20 | $1 \times 10^4$ | 1000 | 1300 |
| Example 7 | 0.06 | $1 \times 10^3$ | 20 | $1 \times 10^4$ | 1000 | 1300 |
| Example 8 | 0.06 | $1 \times 10^5$ | 20 | $1 \times 10^4$ | 1000 | 1300 |
| Example 9 | 0.06 | $5 \times 10^2$ | 20 | $1 \times 10^4$ | 1000 | 1300 |
| Example 10 | 0.06 | $5 \times 10^5$ | 20 | $1 \times 10^4$ | 1000 | 1300 |
| Example 11 | 0.03 | $1 \times 10^5$ | 20 | $1 \times 10^4$ | 1000 | 1300 |
| Example 12 | 0.15 | $1 \times 10^3$ | 20 | $1 \times 10^4$ | 1000 | 1300 |
| Example 13 | 0.06 | $1 \times 10^4$ | 20 | $1 \times 10^4$ | 1300 | 1600 |
| Example 14 | None | | 50 | $1 \times 10^3$ | 1000 | 1300 |
| Comparative Example 1 | None | | 5 | $1 \times 10^5$ | 1000 | 1300 |
| Comparative Example 2 | None | | 60 | $1 \times 10^3$ | 1000 | 1300 |
| Comparative Example 3 | 0.06 | $1 \times 10^4$ | | None | 1000 | 1300 |
| Comparative Example 4 | 0.2 | $5 \times 10^1$ | 20 | $1 \times 10^4$ | 1000 | 1300 |
| Comparative Example 5 | 0.06 | $1 \times 10^4$ | 20 | $1 \times 10^4$ | 1800 | 900 |
| Comparative Example 6 | 0.06 | $1 \times 10^4$ | 20 | $1 \times 10^4$ | 900 | 1800 |
| Comparative Example 7 | 0.06 | $1 \times 10^4$ | 20 | $1 \times 10^4$ | 1200 | 1200 |

TABLE 2

| | Block error rate | | Scream | Contact with head (%) | Error rate after preserved |
|---|---|---|---|---|---|
| | 1 path | 100 paths | | | |
| Example 1 | $2 \times 10^{-3}$ | $5 \times 10^{-3}$ | None | 85 | $3 \times 10^{-3}$ |
| Example 2 | $1 \times 10^{-3}$ | $6 \times 10^{-3}$ | None | 85 | $3 \times 10^{-3}$ |
| Example 3 | $2 \times 10^{-3}$ | $5 \times 10^{-3}$ | None | 85 | $3 \times 10^{-3}$ |
| Example 4 | $3 \times 10^{-3}$ | $5 \times 10^{-3}$ | None | 85 | $4 \times 10^{-3}$ |

TABLE 2-continued

| | Block error rate | | Scream | Contact with head (%) | Error rate after preserved |
|---|---|---|---|---|---|
| | 1 path | 100 paths | | | |
| Example 5 | $1 \times 10^{-3}$ | $5 \times 10^{-3}$ | None | 85 | $3 \times 10^{-3}$ |
| Example 6 | $2 \times 10^{-3}$ | $2 \times 10^{-3}$ | None | 85 | $3 \times 10^{-3}$ |
| Example 7 | $2 \times 10^{-3}$ | $3 \times 10^{-3}$ | None | 85 | $3 \times 10^{-3}$ |
| Example 8 | $4 \times 10^{-3}$ | $4 \times 10^{-3}$ | None | 85 | $6 \times 10^{-3}$ |
| Example 9 | $2 \times 10^{-3}$ | $5 \times 10^{-3}$ | None | 85 | $3 \times 10^{-3}$ |
| Example 10 | $2 \times 10^{-3}$ | $6 \times 10^{-3}$ | None | 85 | $3 \times 10^{-3}$ |
| Example 11 | $2 \times 10^{-3}$ | $3 \times 10^{-3}$ | None | 85 | $3 \times 10^{-3}$ |
| Example 12 | $5 \times 10^{-3}$ | $6 \times 10^{-3}$ | None | 85 | $5 \times 10^{-3}$ |
| Example 13 | $1 \times 10^{-3}$ | $1 \times 10^{-3}$ | None | 90 | $1 \times 10^{-3}$ |
| Example 14 | $5 \times 10^{-3}$ | $7 \times 10^{-3}$ | None | 85 | $6 \times 10^{-3}$ |
| Comparative Example 1 | $1 \times 10^{-3}$ | $1 \times 10^{-2}$ | Present | 85 | $2 \times 10^{-3}$ |
| Comparative Example 2 | $5 \times 10^{-3}$ | $1 \times 10^{-2}$ | None | 85 | $6 \times 10^{-3}$ |
| Comparative Example 3 | $2 \times 10^{-3}$ | $2 \times 10^{-2}$ | Present | 85 | $5 \times 10^{-3}$ |
| Comparative Example 4 | $8 \times 10^{-3}$ | $5 \times 10^{-2}$ | None | 85 | $1 \times 10^{-2}$ |
| Comparative Example 5 | $5 \times 10^{-3}$ | $6 \times 10^{-3}$ | None | 70 | $5 \times 10^{-3}$ |
| Comparative Example 6 | $2 \times 10^{-3}$ | $2 \times 10^{-3}$ | None | 90 | $1 \times 10^{-2}$ |
| Comparative Example 7 | $2 \times 10^{-3}$ | $2 \times 10^{-2}$ | None | 75 | $1 \times 10^{-3}$ |

Examples 2 to 4, 14, and Comparative Examples 1 and 2

Examples 2 to 4 and 14, and Comparative Examples 1 and 2 were prepared basically in the same way as Example 1 except for that the particle diameter and the amount of the $SiO_2$ contained in the polymer film was adjusted to change the fine protrusion height and the density.

Their properties and characteristics are also shown in Table 1 and Table 2.

Example 5

Examples 5 was prepared basically in the same way as Example 1 except for that the polymer film was formed to be 1.0 micrometers/mm² by a wet method from a paint having a composition described below, which was dried after applied.

The composition of the polymer film was as follows: 5 weight parts of terephthalic acid (80 moll %)-5Na-sulfoisophthalic acid (20 moll %)-ethylene glycol copolymer polyester (molecular weight 6500); 2 weight parts of nonion surfactant polyoxyethylenenonyl phenyl ether (produced by Nihon Yushi Co., Ltd.), and 100 weight parts of pure water.

Table 1 shows properties and Table 2 shows characteristics of the cassette tape obtained as Example 5.

Comparative Example 3

Dehydrated n-methylpyrolidon was mixed with 0.9 moll ratio of 2-chlor-p-phenylenediamine and 0.1 moll ratio of 4,4'-diamino diphenyl sulfone to be dissolved and cooled, to which 0.7 moll ratio of terephthalic acid chloride was added and mixed for about 2 hours. After this, sufficiently refined calcium hydrate was added to the aforementioned mixture and mixed. Furthermore, ammonia solution was added for neutralization, and $SiO_2$ particles of 0.06 micrometers dispersed in n-methyl pyrolidone was added in 0.01 wt % per polymer, so as to obtain an aromatic polyamide solution.

This aromatic polyamide solution was uniformly applied on a metal drum having a polished surface at 30° C. and dried for about 10 minutes in an atmosphere of 120° C. to form an aromatic polyamide film. This film was peeled off fro the metal drum in impregnated in water of 30° C. continuously for about 30 minutes while the film was expanded in the length direction by 1.1. Furthermore, the film was introduced into a tenter and expanded in the length direction by 1.3 at 320° C., so as to obtain a non-magnetic substrate having a thickness of about4 micrometers.

In the same way as Example 1, this non-magnetic substrate was covered with a ferromagnetic metal thin film, a carbon protection film, and backcoat layer were formed successively and then cut into an 8-mm width tape, which was contained in a cassette body to obtain a cassette tape.

Table 1 shows properties and Table 2 shows characteristics of the cassette tape thus obtained.

Examples 6 to 10

Example 6 to 10 were prepared basically in the same way as Example 1 by using an aqueous paint containing $SiO_2$ particles having a particle diameter of about 15 nm applied to the surface of the non-magnetic substrate and dried to form a polymer film.

Table 1 shows properties and Table 2 shows characteristics of the Examples 6 to 10.

Examples 11 and 12

Examples 11 and 12 were prepared basically in the same way as Example 6 except for that the aromatic polyamide solution contained $SiO_2$ particles having a particle diameter of 0.03 micrometers and 0.15 micrometers, respectively.

Table 1 shows properties and Table 2 shows characteristics of the cassette tapes thus obtained.

Comparative Example 4

Comparative Example 4 was prepared basically in the same way as Example 6 except for that the aromatic polyamide solution contained $SiO_2$ particles having a particle diameter of 0.2 micrometers.

Table 1 shows properties and Table 2 shows characteristics of the cassette tape thus obtained.

Examples 13

Examples 11 was prepared basically in the same way as Example 6 except for that the aromatic polyamide film was expanded to 1.3 in the length direction and 1.6 in the width direction.

Table 1 shows properties and Table 2 shows characteristics of the cassette tape thus obtained.

Comparative Examples 5 to 7

Comparative Examples 5 to 7 were prepared basically in the same way as Example 6 except for that the aromatic polyamide film was expanded by different magnifications both in the length direction and in the width direction.

Table 1 shows properties and Table 2 shows characteristics of the cassette tapes thus obtained.

Evaluation

As is clear from the results shown in FIG. 1 and FIG. 2, the magnetic recording medium exhibits preferable tape characteristic, contact characteristic, and preservation characteristic when fine protrusions of 5 to 50 nm height are formed in a range $10^3$ to $10^5$ thousand pieces/mm² on the surface where the ferromagnetic metal thin film is formed like in Examples 1 to 14. In contrast to this, the tape characteristic is remarkably deteriorated when the fine protrusion height exceeds 50 nm like in Comparative Example 2 or when no fine protrusions are formed like in Comparative Example 3.

Moreover, as can be seen from the results of Examples 6 to 13 in Table 1 and Table 2, the magnetic recording medium can further suppress deterioration of the tape characteristic when the non-magnetic substrate contains inactive particles having an average particle diameter of 0.03 to 0.15 micrometers so as to form fine protrusions on the surface of the ferromagnetic metal magnetic film at a density of $10^3$ to $10^5$ pieces/mm$^2$. In contrast to this, as can be seen from the Comparative examples 1 and 2, when noprotrusions are formed by additive particles, or when the particles added has a particle diameter exceeding 0.15 micrometers with a density of $10^3$ pieces/mm$^2$ or below, the tape characteristic and the preservation characteristic are remarkably deteriorated.

Furthermore, as can be seen from the results of Examples 1 to 14 in Table 1 and Table 2, the magnetic recording medium can have a preferable contact characteristic with the head when the non-magnetic substrate has a Young's modulus of 1000 kg/mm$^2$ in the longitudinal direction and 1300 kg/mm$^2$ or above in the width direction. In contract to this, when the non-magnetic substrate has a Young's modulus below 1000 kg/m$^2$ in the longitudinal direction like in Comparative Example 6, the preservation characteristic is remarkably deteriorated. Moreover, when the non-magnetic substrate has a Young's modulus below 1300kg/mm$^2$ in the width direction like Comparative Examples 5 and 7, the contact characteristic with the head is remarkably deteriorated.

Next, a magnetic recording medium was actually prepared as Examples 15 to 21 and Comparative Examples 8 to 13 and their tape characteristics and friction characteristics were evaluated.

It should be noted that measurements were also made to determine the number of fine protrusions in the upper 25% of the load curve, the ratio of the cross sectional areas of the fine protrusions in the upper 25% of the load curve, and an average cross sectional area of one fine protrusion in the upper 25% of the load curve.

The properties and characteristics of these magnetic recording media were evaluated as follows.

<Surface Protrusion Height>

In the same way as in Examples 1 to 14 and Comparative Examples 1 to 7, using an inter-atom force microscope (AFM) Nano Scope II (trade name) produced by Digital Instruments, the ferromagnetic metal thin film of the non-magnetic substrate was observed under the conditions of scan size 5 micrometers×5 micrometers, the sampling number of 400 points, and the scan rate of 4.34 Hz. Heights of ten protrusions were measured and their average was obtained as the surface protrusion height.

<Number of Surface Protrusions>

In the same way as in Examples 1 to 14 and Comparative Examples 1 to 7, the number of fine protrusions was measured by using a scan electron microscope (SEM). The SEM actually used was an Ultra-resolution Cold FE-SEM (trade name) produced by Nippon Electron Co., Ltd. with an acceleration voltage of 20 kV and magnification of 30,000 or above. The count obtained was converted into a count per 1 mm$^2$.

<Number of Protrusions in the Upper 25% of the Load Curve>

The inter-atom force microscope (AFM) Nano Scope II (trade name) produced by Digital Instruments was used to observe the ferromagnetic metal thin film on the non-magnetic substrate with a scan size of 5 micrometers×5 micrometers, a sampling count of 400 points, and scan rate of 4.34 Hz.

<Total of Cross Sectional Areas of Protrusions in the Upper 25% of the Load Curve>

In the same ways as counting the number of protrusion, the inter-atom force microscope (AFM) Nano Scope II (trade name) produced by Digital Instruments was used to observe the ferromagnetic metal thin film of the non-magnetic substrate under the conditions of scan size 5 micrometers×5 micrometers, the sampling number of 400 points, and the scan rate of 4.34 Hz.

<Average Cross Sectional Area of a Protrusion in the Upper 25% of the Load Curve>

In the same ways as counting the number of protrusion, the inter-atom force microscope (AFM) Nano Scope II (trade name) produced by Digital Instruments was used to observe the ferromagnetic metal thin film of the non-magnetic substrate under the conditions of scan size 5 micrometers×5 micrometers, the sampling number of 400 points, and the scan rate of 4.34 Hz.

<Tape Characteristics>

The magnetic medium as a tape was evaluated by using the AIT drive SDX-S300C. (trade name) produced by Sony Co., Ltd with some revision. The recording was carried out at a relative speed of 10.04 mn/second and with the shortest recording wavelength of 0.35 micrometers.

In a magnetic tape for data, lowering of the electro-magnetic conversion characteristic caused by surface roughness or by deterioration of running durability all results in the error rate. Here, the magnetic recording media of Examples 15 to 21 and Comparative Examples 8 to 13 were evaluated in their error rates. The acceptable block error rate was set to $10^{-2}$ or below.

<Friction Coefficient>

A fiction coefficient was checked after 100 times of sliding against a guide pin (SUS, 0.1S) in the atmosphere of a room temperature and a normal humidity (25° C., 40%), with a load of 10 g and a sliding speed of 5 mm/sec. The acceptable friction coefficient after 100 paths was set to 3.0 or below.

The magnetic recording media of Examples 15 to 21 and Comparative Examples 8 to 13 were prepared in the same way as the magnetic recording medium of Examples 1 to 14 and Comparative Examples 1 to 7.

Table 3 shows properties and Table 4 shows characteristics of these magnetic recording media of Examples 15 to 21 and Comparative Examples 8 to 13.

TABLE 3

| | Fine protrusions | | Fine protrusions in the upper 25% of load curve | | |
|---|---|---|---|---|---|
| | Number of protrusions (10 thousand/mm²) | Surface protrusion height (nm) | Number of protrusions (10 thousand/mm²) | Total of cross sectional areas of protrusions against area of reference plane (%) | Cross sectional area per protrusion (nm²) |
| Example 15 | 500 | 15 | 100 | 0.12 | $1.20 \times 10^3$ |
| Example 16 | 800 | 30 | 200 | 0.10 | $0.50 \times 10^3$ |
| Example 17 | 900 | 30 | 240 | 0.12 | $0.50 \times 10^3$ |
| Example 18 | 1500 | 40 | 350 | 0.30 | $0.90 \times 10^3$ |
| Example 19 | 3000 | 50 | 500 | 0.50 | $1.00 \times 10^3$ |
| Example 20 | 800 | 40 | 330 | 0.35 | $1.00 \times 10^3$ |
| Example 21 | 2000 | 8 | 100 | 0.05 | $0.50 \times 10^3$ |
| Comparative Example 8 | 550 | 20 | 90 | 0.19 | $2.10 \times 10^3$ |
| Comparative Example 9 | 600 | 30 | 400 | 1.90 | $5.10 \times 10^3$ |
| Comparative Example 10 | 700 | 20 | 190 | 0.40 | $1.90 \times 10^3$ |
| Comparative Example 11 | 900 | 30 | 250 | 0.50 | $2.00 \times 10^3$ |
| Comparative Example 12 | 15000 | 60 | 600 | 0.90 | $1.50 \times 10^3$ |
| Comparative Example 13 | 90 | 3 | 80 | 0.10 | $0.50 \times 10^3$ |

TABLE 4

| | Friction coefficient | | Block error rate | |
|---|---|---|---|---|
| | 1 path | 100 paths | 1 path | 100 paths |
| Example 15 | 0.25 | 0.26 | $2 \times 10^{-3}$ | $5 \times 10^{-3}$ |
| Example 16 | 0.22 | 0.23 | $2 \times 10^{-3}$ | $4 \times 10^{-3}$ |
| Example 17 | 0.20 | 0.21 | $1 \times 10^{-3}$ | $2 \times 10^{-3}$ |
| Example 18 | 0.23 | 0.26 | $2 \times 10^{-3}$ | $5 \times 10^{-3}$ |
| Example 19 | 0.28 | 0.30 | $3 \times 10^{-3}$ | $6 \times 10^{-3}$ |
| Example 20 | 0.24 | 0.26 | $2 \times 10^{-3}$ | $6 \times 10^{-3}$ |
| Example 21 | 0.25 | 0.28 | $2 \times 10^{-3}$ | $6 \times 10^{-3}$ |
| Comparative Example 8 | 0.25 | 0.35 | $2 \times 10^{-3}$ | $2 \times 10^{-2}$ |
| Comparative Example 9 | 0.30 | 0.34 | $8 \times 10^{-3}$ | $4 \times 10^{-2}$ |
| Comparative Example 10 | 0.40 | 0.42 | $6 \times 10^{-2}$ | $8 \times 10^{-2}$ |
| Comparative Example 11 | 0.32 | 0.34 | $4 \times 10^{-3}$ | $2 \times 10^{-2}$ |
| Comparative Example 12 | 0.32 | 0.33 | $8 \times 10^{-3}$ | $1 \times 10^{-1}$ |
| Comparative Example 13 | 0.40 | 0.42 | $6 \times 10^{-3}$ | $6 \times 10^{-2}$ |

Evaluation

As is clear from the results of Examples 15 to 21 in Table 3 and Table 4, it is possible to obtain an excellent electro-magnetic characteristic, running durability, and the like when the non-magnetic substrate has fine protrusions having a height of 5 to 50 nm; the number of the fine protrusions is in a range from $1 \times 10^3$ to $1 \times 10^5$ thousand pieces/mm²; the number of fine protrusions in the upper 25% of the load curve is $10^3$ to $5 \times 10^3$ thousand pieces/mm²; the ratio of the total cross sectional areas of the fine protrusions is 0.1 to 0.5% with respect to the reference plane; and an average cross sectional area of a fine protrusion in the upper 25% of the load curve is $1.5 \times 10^3$ nm² or below.

It should be noted that in Example 20, the non-magnetic substrate contains additive particles of the same type of aromatic polyamide resin used as a raw material of the non-magnetic substrate which is not dissolved in the solvent during a solution molding. The particles has various characteristics in appropriate ranges and the recording medium exhibited an excellent electro-magnetic conversion characteristic and running durability.

In contrast to these example, Comparative Example 8 defined by that the number of fine protrusions in the upper 25% of the load curve is below $10^3$ to $5 \times 10^3$ thousand pieces/mm² and that an average cross sectional area of a fine protrusion in the upper 25% of the load curve exceeds $1.5 \times 10^3$ nm² had rather smooth configuration of the fine protrusions and exhibited an excellent electro-magnetic conversion characteristic but had a too large contact area, disabling to obtain a preferable running durability.

Moreover, in Comparative Example 9, the total of cross sectional areas of the fine protrusions in the upper 25% of the load curve exceeded 0.5% of the reference plane, and the average cross sectional area per fine protrusion in the upper 25% of the load curve exceeds $1.5 \times 10^3$ nm². Accordingly, like Comparative Example 8, the configuration of the fine protrusions was rather smooth, enabling to obtain an excellent electro-magnetic conversion characteristic, but it was impossible to obtain a preferable running durability.

Moreover, in Comparative Examples 10 and 11, the average cross sectional area per fine protrusion in the upper 25% of the load curve exceeded $1.5 \times 10^3$ nm². Accordingly, like Comparative Example 8 and 9, the configuration of the fine protrusions was rather smooth, enabling to obtain an excellent electro-magnetic conversion characteristic, but it was impossible to obtain a preferable running durability.

Moreover, in Comparative Example 11, the non-magnetic substrate had fine protrusions having a height exceeding 50 nm; the number of protrusions exceeded $1 \times 10^5$ thousand pieces/mm²; the number of fine protrusions in the upper 25% of the load curve exceeded $5 \times 10^3$ thousand pieces/mm²; and the total of the cross sectional areas of the fine protrusions in the upper 25% of the load curve exceeded 0.5% of the reference area (at height m). Accordingly, the non-magnetic substrate had quite a rough surface, significantly deteriorating the electro-magnetic conversion characteristic. Moreover, because of the smooth configuration of the fine protrusions, the contact area was too large, disabling to obtain a preferable running durability.

Moreover, in Comparative Example 13, the non-magnetic substrate had fine protrusions having a height below 5 nm; the number of protrusions was below $1\times10^3$ thousand pieces/mm$^2$; and the number of fine protrusions in the upper 25% of the load curve was below $10^3$ thousand pieces/mm$^2$. It was impossible to obtain a preferable running durability.

The magnetic recording medium according to the present invention includes a non-magnetic substrate made from an aromatic polyamide film having fine protrusions of an average height of 5 to 50 nm in a range $10^3$ to $10^5$ thousand pieces/mm$^2$ on a surface where a ferromagnetic metal thin film is to be formed. Accordingly, it is possible to obtain a preferable tape characteristic, preferable contact characteristic, and preferable preservation characteristic, enabling to obtain a preferable electromagnetic conversion characteristic and preferable running characteristic simultaneously.

Moreover, this magnetic recording medium includes a non-magnetic substrate containing inactive particles of 0.03 to 0.15 micrometers, so as to form $10^3$ to $10^5$ pieces/mm$^2$ of protrusions. This enables to suppress deterioration of the tape characteristic and prevent head clogging, i.e., increase the head cleaning effect.

Moreover, this magnetic recording medium includes a non-magnetic substrate having a thickness of 2.0 to 6.0 micrometers and a ferromagnetic metal thin film having a thickness of 0.01 to 0.2 micrometers, so as to make the entire thickness sufficiently thin to cope with a long-time recording.

Moreover, this magnetic recording medium includes can exhibit a preferable friction characteristic when the non-magnetic substrate has fine protrusions in a range of $10^3$ to $5\times10^3$ thousand pieces/mm$^2$ in the upper 25% of the load curve determined from the side of the fine protrusions and when the ratio of the total of the cross sectional areas of the fine protrusions is in a range from 0.1 to 0.5%.

Moreover, if it is assumed that m is the height of the bottom of the deepest indentation defined by the fine protrusions, n is the height of the tip of the highest fine protrusion, and s is a distance between the m and n, i.e., s=m−n, then this magnetic recording medium can exhibit further preferable fiction characteristic during recording/reproduction when the number of fine protrusions having a height exceeding ¾×s+m is in a range from $10^3$ to $5\times10^3$ thousand/mm$^2$ and the total of their cross sectional areas at the height of ¾×s+m is 0.1 to 0.5% of the cross sectional area of the non-magnetic substrate at the height m.

Furthermore, this magnetic recording medium can exhibit further preferable running characteristic and preservation characteristic when the non-magnetic substrate has Young's modulus of 1000 kg/mm$^2$ in the longitudinal direction and 1300 kg/mm$^2$ in the width direction.

What is claimed is:

1. A magnetic recording medium having a ferromagnetic metal thin film formed on a non-magnetic substrate made from an aromatic polyamide film having $10^3$ to $10^5$ thousand pieces/mm$^2$ of fine protrusions having an average height of 5 to 50 nm on a surface where said ferromagnetic metal thin film is to be formed, wherein, if it is assumed that m is the height of the bottom of the deepest indentation defined by the fine protrusions, n is the height of the tip of the highest fine protrusions, and s is a distance between the m and n, i.e., s=m−n, then the number of fine protrusions having a height exceeding ¾×s+m is in a range from $10^3$ to $5\times10^3$ thousand/mm$^2$ and the total of their cross sectional areas at the height of ¾×s+m is 0.1 to 0.5% of a cross sectional area of the non-magnetic substrate at the height m.

2. A magnetic recording medium as claimed in claim 1, wherein said non-magnetic substrate contains inactive particles having an average particle diameter of 0.03 to 0.15 micrometers so that protrusions are formed with density of $10^3$ to $10^5$ pieces/mm$^2$ on a surface where said ferromagnetic metal thin film is to be formed.

3. A magnetic recording medium as claimed in claim 1, wherein said non-magnetic substrate has a thickness of 2.0 to 6.0 micrometers and said ferromagnetic metal film has a thickness of 0.01 to 0.2 micrometers.

4. A magnetic recording medium as claimed in claim 1, wherein said fine protrusions exceeding said height of ¾×s+m have an average cross sectional area of $1.5\times10^3$ nm$^2$ at a height of ¾×s+m.

5. A magnetic recording medium as claimed in claim 1, wherein said non-magnetic substrate has Young' modulus of 1000 kg/mm$^2$ or above in the longitudinal direction and 1300 kg/mm$^2$ or above in the width direction.

* * * * *